United States Patent
Azzarelli et al.

(10) Patent No.: US 6,195,043 B1
(45) Date of Patent: Feb. 27, 2001

(54) AOA ESTIMATION AND POLARIZATION INDUCED PHASE CORRECTION USING A CONFORMAL ARRAY OF TITLED ANTENNA ELEMENTS

(75) Inventors: Teodoro Azzarelli, Los Angeles; Paul Kwon, Chatsworth; Ephraim Mendelovicz, Northridge, all of CA (US)

(73) Assignee: Science and Applied Technology, Inc., San Diego, CA (US)

( * ) Notice: Subject to any disclaimer, the term of this patent is extended or adjusted under 35 U.S.C. 154(b) by 0 days.

(21) Appl. No.: 09/311,139

(22) Filed: May 13, 1999

(51) Int. Cl.[7] ................................................. H01Q 21/06
(52) U.S. Cl. .................. 342/362; 342/374; 342/424; 342/442; 342/445
(58) Field of Search ................. 342/52, 56, 147, 342/156, 175, 195, 351, 361–377, 417–449, 13, 20; 367/118, 124, 125, 128

(56) References Cited

U.S. PATENT DOCUMENTS

| | | | |
|---|---|---|---|
| 3,836,973 | * 9/1974 | Shnitkin et al. | 342/362 |
| 4,121,216 | * 10/1978 | Bunch et al. | 342/424 |
| 4,540,139 | 9/1985 | Levy . | |
| 5,032,844 | * 7/1991 | Hipp et al. | 342/434 |
| 5,404,144 | 4/1995 | Vlannes . | |
| 5,457,465 | 10/1995 | Collier . | |
| 5,568,154 | 10/1996 | Cohen . | |
| 5,936,575 | * 8/1999 | Azzarelli et al. | 342/362 |
| 6,104,346 | * 8/2000 | Rudish et al. | 342/424 |

* cited by examiner

Primary Examiner—Bernarr E. Gregory
(74) Attorney, Agent, or Firm—Michael Blaine Brooks (57) ABSTRACT

An apparatus and method for determining the angles-of-arrival and the polarization states of incoming RF signals of unknown polarization using five or more RF sensing antenna elements of differing yet known orientations of polarization. The apparatus includes an array of broad gain, substantially identical, RF sensing antenna elements of differing yet known orientations of polarization, an antenna element selection network, RF receiver channels, processing means for determining uncorrected phase differences from received RF signal phases for pairs of antennas, processing means for determining received signal powers, processing means for determining from RF signal powers corrections to the phase difference errors caused by polarization diversity between pairs of antennas, processing means for correcting uncorrected phase differences with determined phase difference corrections, processing means for determining incoming RF signal frequencies, processing means for determining ambiguous and unambiguous angles-of-arrival of incoming RF signals and processing means for determining the polarization states of incoming RF signals.

23 Claims, 6 Drawing Sheets

AOA ESTIMATION AND POLARIZATION INDUCED PHASE CORRECTION USING A CONFORMAL ARRAY OF TITLED ANTENNA ELEMENTS

FIELD AND BACKGROUND OF THE INVENTION

The present invention relates to the determining of angles-of-arrival of incoming RF signals with an antenna array of RF sensing elements. More particularly, the present invention relates to determining angles-of-arrival and the polarization of incoming RF signals as sensed by an antenna configuration in which antenna elements are mounted onto a non-planar surface in a fashion whereby the elements conform to the surface. This RF signal sensing array is also known as a conformal array of antenna elements. It is in such a non-planar array that the antenna elements of the conformal array are, by necessity, of differing, yet known, orientations of polarization.

The object of the present invention is to improve upon existing and well established interferometric techniques which apply measurements of phase differences between sets of antenna element pairs of similar orientations of their respective polarizations to determine unambiguous angles-of-arrival of incoming RF signals. Furthermore, the present invention is an improvement upon U.S. patent application Ser. No. 09/023,381, filed Feb. 13, 1998, now U.S. Pat. No. 5,936,575, where an additional degree of freedom is introduced such that the polarization direction of the RF antenna elements possess a tilt angle relative to the missile body. The invention manifests itself in the exploitation of amplitude measurements or the equivalent powers of incoming RF signals, which when processed according to the teachings of this invention, provide the required polarization induced phase correction allowing for the determination of the angles-of-arrival and the polarization of incoming RF signals with antenna elements of diverse orientations of polarization without the necessary application of iterative, linearly approximated solutions.

Conventional interferometry is a method reliant upon the measurement and processing of the electrical phase differences between the signals received at the ports of a number of antenna element pairs to derive the hitherto unknown direction of arrival in angle space of a received RF signal.

In the prior art of conventional interferometry, any polarization mismatch that exists between the set of receiving antennas and the polarization state of an incoming radar signal has no effect on the relative electrical phase of the voltages induced at the various antenna element terminals. While the polarization mismatch affects both the phase and the amplitude of the various voltages, it does so substantially identically, provided the polarization of the receiving antennas are all substantially equivalent.

Thus, in conventional interferometry the phase difference, $\Delta\Psi$, between any pair of antennas is solely a function of the path difference traveled by the incoming wave-front as it impinges upon the particular antenna element pair. This relationship is expressed as $$\Delta\Psi = 2\pi \frac{D_a}{\lambda} \sin(\Theta) - 2n\pi \quad [1]$$

where the baseline, $D_a$, is the distances between the phase centers of the two antenna elements and $\lambda$ is the wavelength of the received radar signal. The angle $\Theta$ represents the unknown angle between the geometric normal to the baseline $D_a$ and the direction of the incoming wave.

Through operational inversions of Equation 1, the angle $\Theta$ can be obtained in terms of the measured electrical phase difference $\Delta\Psi$ provided that a possible angular ambiguity, represented here by the term $2n\pi$, can be removed. This ambiguity to be resolved exists whenever the ratio $$\frac{D_a}{\lambda}$$

is larger than one-half.

Since the direction of an incoming wave is uniquely defined in space by two polar angles, two equations in the inverted form of Equation 1 using non-parallel baselines are required to obtain these angles-of-arrival. However, the removal of ambiguities may require additional pairs of antennas. Methods for removing these ambiguities are well known. One of several known methods for resolving the angles-of-arrival uses a series of two-channel interferometers with progressively increasing separations such that the lowest separation is equal to $$\frac{\lambda}{2}$$

at the highest operating frequency. The first angles-of-arrival estimate is therefore the coarsest but is unambiguous. Using the remaining larger baseline interferometers subsequently refines this angles-of-arrival measurement. Another well-known method uses three or more interferometers with baselines greater than $$\frac{\lambda}{2}.$$

Figure 1:
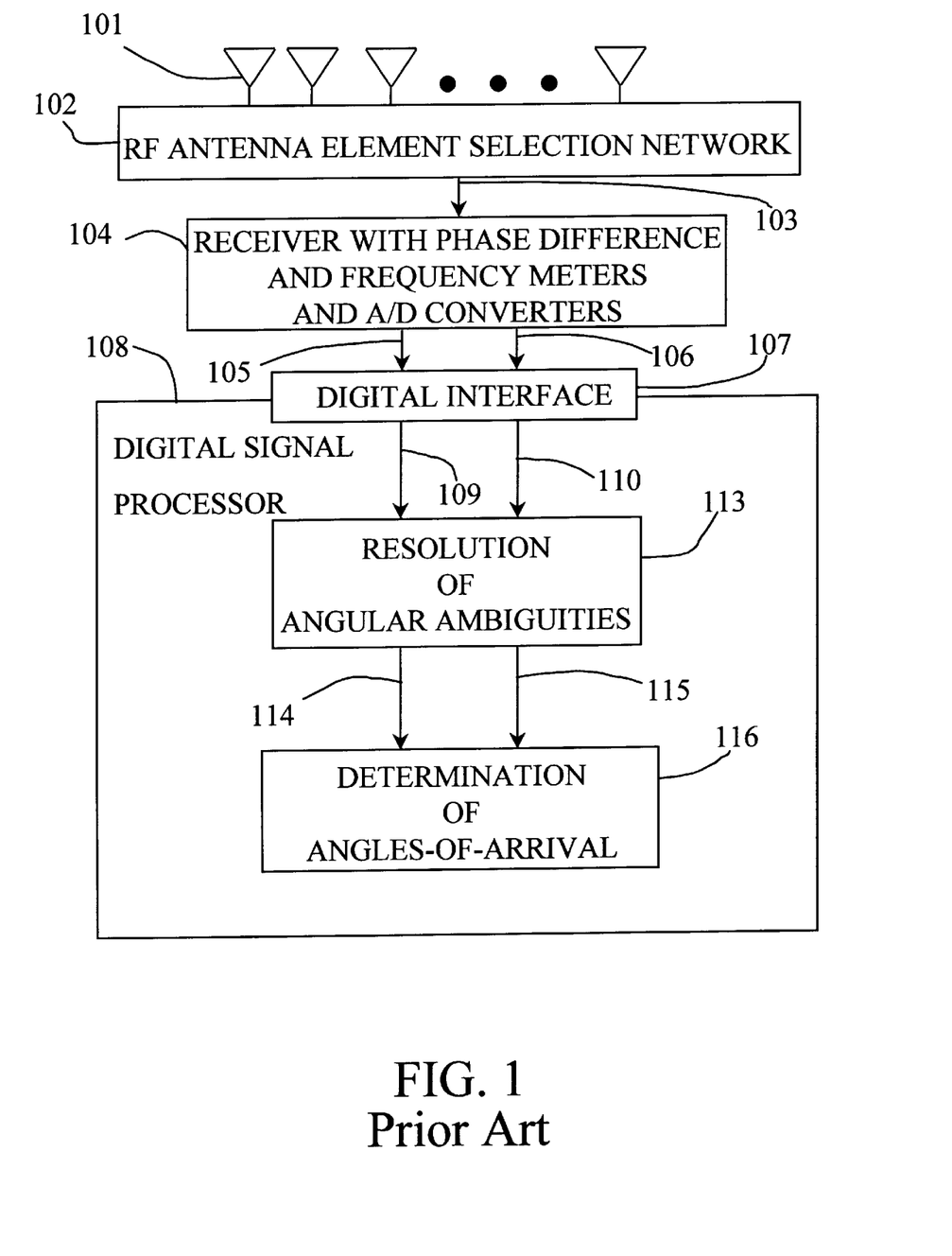
FIG. 1 is a flow chart of a process according to the prior art for determining angles-of-arrival of an emitting RF source with a RF antenna element array of substantially similar polarization orientations according to the prior art.

However, the antenna separations are selected in specific ratios such that ideally, and in the absence of noise, only one pair of angles-of-arrival values is consistent with the measured phase differences and the associated ambiguity numbers. Methods of ambiguity removal can be used from U.S. patent application Ser. No. 09/287,256, filed Apr. 7, 1999, now U.S. Pat. No. 6,140,963. Referring now to the prior art figures in detail wherein like reference numerals indicate like elements throughout the several views, the prior art can be illustrated by a flowchart of the process in FIG. 1 and a block diagram of the apparatus in FIG. 2. RF sensing elements of similar orientation of polarization 101 are selected by an RF selection network 102 so that receivers 104 may receive their respective voltages 103 and measure the signal frequency and the inter-antenna phase differences and then convert the analog measurements to digital form. The measured digitized phase differences 105 and measured digitized signal frequency 106 are sent to a digital interface 107 of a digital signal processor 108. Any polarization diversity among the individual antenna elements, intentional or otherwise, will produce errors in the respective phase differences of 105. These angular errors, should they arise, are not first accounted for and then corrected for in the prior art. Within the digital signal processor, the digitized phase differences 110 and the measured digitized signal frequency 109 in the reciprocal form of wavelength are applied to the resolution of angular ambiguities 113. The resolved unambiguous phase differences 114 and the wavelength 115 are applied to the determination of angles-of-arrival 116.

Figure 2:
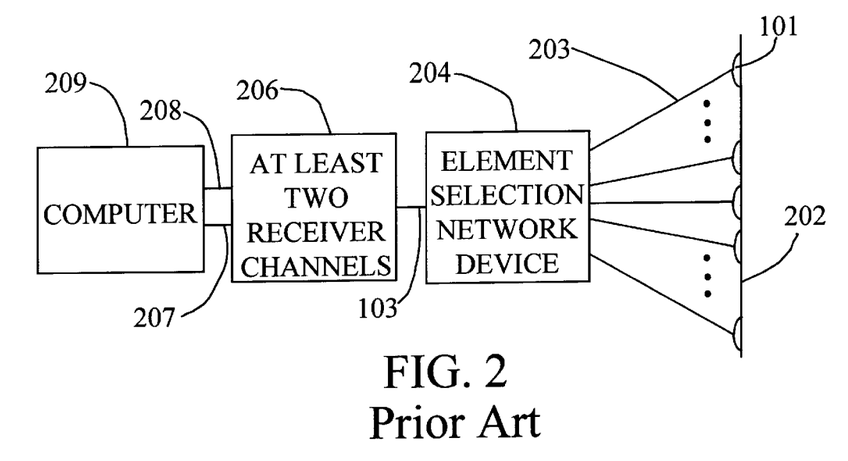
FIG. 2 is a block diagram of a prior art method.

FIG. 2 illustrates a block diagram of a prior art apparatus. Individual RF sensing elements individually identified as 101 are mounted on a surface without curvature 202. Each element is connected to an element selection network 204 by an electrically conductive line 203. Each antenna element generates a voltage when excited by a RF wave-form. The element selection network selects pairs of antenna elements for the application of interferometry. At least two receiver channels 206 are required. The resulting antenna pairs sensed voltages are conveyed along a conductive harness 103 to a RF receiver 206. For each signal pair difference the individual receiver outputs a phase difference 207. Additionally, the receiver will output a measure of frequency of the RF signal 208. The phase differences 207 and frequency 208 of the RF signal are input signals to a special purpose computer 209.

SUMMARY OF THE INVENTION

The main object of the present invention is to provide a method and apparatus for determining angles-of-arrival and polarization states of incoming RF signals with an antenna array comprising a plurality of RF sensing elements of differing and substantially known orientations of polarization. The angles-of-arrival are the two body-relative polar angles of the direction of arrival of the received electromagnetic incoming wave. Two emitter polarization angles define the electrical field characteristics of an incoming wave of a particular frequency.

It is often necessary to place antenna elements within the constraints of special orientations as required for practical configurations with non-planar surfaces. These antenna configurations are generally not amenable to the use of conventional interferometry due to the significant polarization diversity among the several antenna elements creating significant errors in the derived angles-of-arrival. The most significant failure of conventional interferometry when compared to polarization diverse interferometry is the inability of the former to account for the orientations of polarization of the antenna elements which are different by virtue of the geometrical constraints imposed by a curvilinear antenna array. Polarization diverse interferometry on the other hand, by its accounting for the receiving antenna elements' polarization diversity, is a generalization of the conventional interferometry. The conventional interferometric method fails to give sufficiently accurate estimates of angles-of-arrival because it does not account for the polarization-induced errors present in antenna arrays mounted upon curvilinear surfaces. When the orientations of the polarization of the receiving antennas are not identical, Equation 1 must be modified to include an additional phase correcting term, $\Delta\Psi_P$, as follows:

$$\Delta\Psi = 2\pi \frac{D_a}{\lambda} \sin(\Theta) + \Delta\Psi_P - 2n\pi \quad [2]$$

This phase correction $\Delta\Psi_P$ is required here to account for the polarization diversity of the receiving antenna elements and is generally a function of: the polarization orientation of the elements; the two unknown angles-of-arrival; the two additional, hitherto unknown, emitter polarization parameters. Because of the dependence of the term $\Delta\Psi_P$ upon two angles-of-arrival, the two emitter polarization parameters, all of which are unknown, Equation 2 is generally a complex relationship of these four unknowns and the measurable phase difference. If one chooses to process only phase information, a minimum of four independent relations (i.e., four antenna element pairs) are required to solve for the four unknowns. Moreover, in contrast with relationships such as Equation 1, these coupled equations are transcendental in the angles-of-arrival and the polarization angles and cannot therefore be solved in closed form.

Below is described a new step in a process and a corresponding new elemental component in an apparatus for estimating the correcting phase $\Delta\Psi_P$ that extracts information contained within the amplitudes of the voltages of at least five antenna element terminals. Using this approach, the phase correcting term $\Delta\Psi_P$ is obtained directly from the voltage amplitude, that is, the root of the power, and the known antenna element phase center positions. Thus, one need not iteratively solve the equations expressed in terms of the angles-of-arrival and the accompanying emitter polarization parameters. After the correction is made, Equation 2 is applied in exactly the same manner as one would apply Equation 1 in classical interferometry to remove any existing ambiguities and obtain angles-of-arrival.

ESTIMATION OF THE PHASE ANGLE CORRECTION

Figure 3:
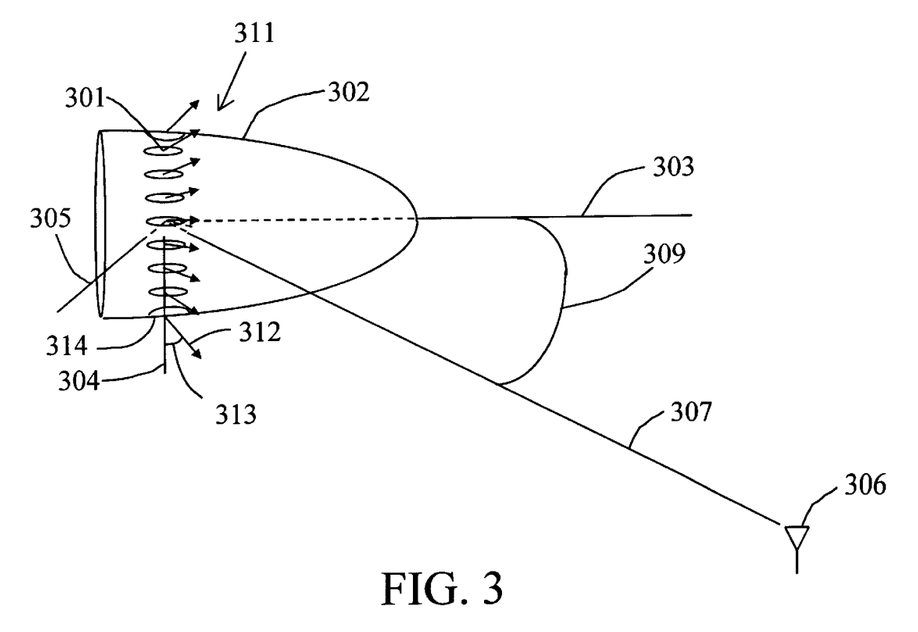
FIG. 3 illustrates the orientation and mounting of a RF antenna element array with diverse orientations of each element's respective polarization with angles-of-arrival to a source of RF emissions used to explain the present invention.
Figure 4:
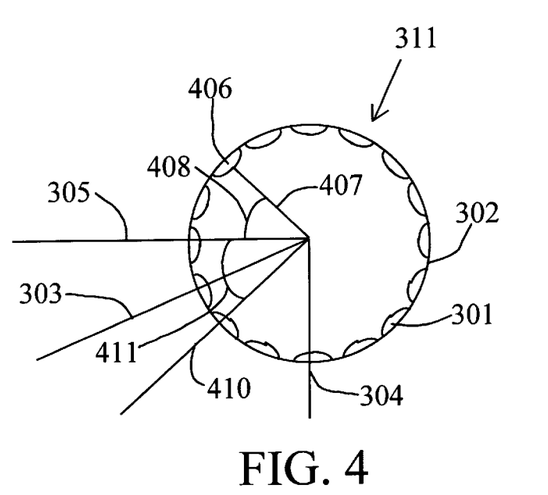
FIG. 4 illustrates a transverse cut through the mounting portion of a RF antenna element array of diverse orientations of each element's respective polarization used to explain the present invention.

Referring now to the other figures in detail wherein like reference numerals indicate like elements throughout the several views. In FIGS. 3 and 4, the conformal antenna element array configuration used in deriving the phase correction angle is shown. FIG. 3 illustrates the orientation and mounting of a RF antenna element array 311 of diverse orientations of polarization with angles-of-arrival to a source of RF emissions 306 used to explain the present invention. An individual RF sensing element 301, when working in cooperation with other similar elements mounted on a surface 302, becomes an integral part of a RF antenna element array 311. The mounting surface 302 illustrated is the shape of a cone with a rounded apex and could also be the shape of a right cone, a cylinder or any other convex or even concave surface. A principal axis 303 passes through a point at the center of the conical base of 302 and a point at the tip of the rounded apex. The antenna array 311 forms a ring around the principal axis 303, also referred to as the positive z-axis. With the principal axis defining a forward horizontal directional axis, the y-axis 304 is a down directional axis and the x-axis 305 is a "to the right" directional axis.

An individual sensing element 314 possesses a polarization orientation given by vector 312, which is in the plane created by the principal axis 303 and the phase center of the element 314. The angle between vector 312 and the plane including the axes 304 and 305 is the angle 313. The angle 313 is the tilt angle, τ. The tilt angle 313 is substantially equivalent for each of the sensing elements comprising the array 311.

A vector directly from the center of the RF antenna array 311 to the RF emitting source 306 is designated the line-of-sight vector 307, and is the directional vector of the RF emitting source 306 relative to the RF antenna array 311. The angle created by the sides 303 and 307 is 309. The angle 309 is one of two of the angles-of-arrival, θ.

Referring to FIG. 4, a view of the conformal antenna element array configuration used in deriving the phase correction angle is shown looking down the principal axis 303. In this configuration a number of substantially similar antenna elements are located along a circle or ellipse and are linearly polarized. The position of each antenna is defined in the plane containing the antenna elements by polar angle a 408 as shown in FIG. 4. The angle created by the body-fixed, "to the right" directional axis reference 305 and the line-of-sight vector projection 410 is the second angle-of-arrival 411, φ.

The instantaneous electrical field of the incoming wave from RF emitting source 306 contained in a plane perpendicular to the direction of the incoming wave is E. In an arbitrary Cartesian reference frame with axes x and y and unit vectors $\hat{x}$ and $\hat{y}$, and emitter polarization angles $\gamma$ and $\delta$, E can be expressed as $$E = E_X \cos(\omega t)\hat{x} + E_Y \cos(\omega t + \delta)\hat{y} \quad [3]$$

where $\delta$ is the phase by which the y-component leads the x-component, $\omega$ is the oscillatory frequency of the electrical field and the angle $\gamma$ describes the relative values of $E_x$ and $E_y$ as follows:

$$\gamma = \arctan(E_y/E_x) \text{ for } 90 \geq \gamma \geq 0 \text{ degrees.} \quad [4]$$

The open circuit voltage at a particular sensing element is given by the inner product of the complex conjugate of the polarization state vector, which characterizes the state of the receiving antenna, and the electric field. The instantaneous complex voltage measured by an element at angular position a is proportional to v(α), and may be expressed in the form:

$$v(\alpha) = (X \cos\alpha + Y \sin\alpha + Z)\exp\left[j\frac{2\pi R}{\lambda}\sin(\theta)\cos(\phi - \alpha)\right] \quad [5]$$

where X and Y are both complex numbers, and Z is real. As will be shown, the polarization diversity phase term may be expressed as a function of the five real variables, $X_R$, $X_I$, $Y_R$, $Y_I$, Z, where:

$$X = X_R + jX_I \quad [6]$$

$$Y = Y_R + jY_I \quad [7]$$

which may be determined from the measured powers of five or more channels. The variables X, Y, and Z are functions of the angles-of-arrival as well and the polarization of the emitter and receiver, but are independent of the polar angle α 408. While each individual antenna element of FIG. 3 is depicted as a linearly-polarized infinitesimal dipole, Equation 5 is a generalized expression and may be used to characterize any single antenna with arbitrary polarization on the condition that the element can be approximated by an antenna of infinitesimal physical extent located at the angular position a on a cylindrical surface.

The amplitude squared or power, P, received at an antenna element varies as a function of the antenna element at position angle α 408 as follows:

$$P = a + b\cos(2\alpha) + c\sin(2\alpha) + d\cos(\alpha) + e\sin(\alpha) \quad [8]$$

where a, b, c, d, and e, the five amplitudes of Equation 8, are independent of α and expressible in terms of X, Y, and Z, which are implicit functions of the two polar angles-of-arrival θ and φ, the hitherto unknown polarization of the incoming wave described by two emitter polarization angles γ and δ, and electric field strength.

According to the teachings of the present invention, the coefficients, a, b, c, d, and e, when determined from the measured values of signal power, P, contain all the information required to describe and correct for the effects of polarization upon the angles-of-arrival. The long felt need for a one-step solution is met with the present invention where the point of novelty is that with five or more measures of signal power, the angles-of-arrival for conformal arrays of tilted dipoles can be found directly.

The coefficients, a, b, c, d, and e, can be estimated using a minimum of five, but preferably more, measured values of power, P, at various antenna locations, $\alpha_i$, where i corresponds to antenna element location. Where more than five measurements are used, the five coefficients are estimated using a simple least squares fit of the data to the above expression for the power P given by Equation 8. Other optimal estimation techniques, such as the maximum likelihood or weighted least squares techniques, can also be applied to estimate the coefficients a, b, c, d, and e.

The relationship between the coefficients, a, b, c, d, and e, and the five hitherto unknown values of X, Y, and Z, are as follows:

$$a = \frac{1}{2}(|X|^2 + |Y|^2) + Z^2 \quad [9]$$

$$b = \frac{1}{2}(|X|^2 - |Y|^2) \quad [10]$$

$$c = X_R Y_R + X_I Y_I \quad [11]$$

$$d = 2ZX_R \quad [12]$$

$$e = 2ZY_R \quad [13]$$

Note that this system of equations may be solved for X, Y, and Z without prior knowledge of the angles-of-arrival, θ and φ, and the polarization parameters, γ and δ. Using these relationships, calculation of the angles θ and φ, and the polarization parameters γ and δ, can be avoided and the polarization diversity phase determined and corrected.

To obtain the coefficients a, b, c, d, and e, one must realize that for every antenna position $\alpha_i$, there will be a corresponding power measurement, $P_i$. In terms of the antenna element position and the five coefficients, this measurement is expressed as $$P_i = a + b\cos 2\alpha_i + c\sin 2\alpha_i + d\cos\alpha_i + e\sin\alpha_i. \quad [14]$$

Thus, for five measurements, one expresses the five simultaneous equations as:

$$\begin{Bmatrix} P_1 \\ P_2 \\ P_3 \\ P_4 \\ P_5 \end{Bmatrix} = \begin{vmatrix} 1 & \cos 2\alpha_1 & \sin 2\alpha_1 & \cos\alpha_1 & \sin\alpha_1 \\ 1 & \cos 2\alpha_2 & \sin 2\alpha_2 & \cos\alpha_2 & \sin\alpha_2 \\ 1 & \cos 2\alpha_3 & \sin 2\alpha_3 & \cos\alpha_3 & \sin\alpha_3 \\ 1 & \cos 2\alpha_4 & \sin 2\alpha_4 & \cos\alpha_4 & \sin\alpha_4 \\ 1 & \cos 2\alpha_5 & \sin 2\alpha_5 & \cos\alpha_5 & \sin\alpha_5 \end{vmatrix} \begin{Bmatrix} a \\ b \\ c \\ d \\ e \end{Bmatrix}, \quad [15]$$

and solves for the five coefficients directly with a matrix inverse. The matrix expression for the five coefficients is $$\begin{Bmatrix} a \\ b \\ c \\ d \\ e \end{Bmatrix} = \begin{vmatrix} 1 & \cos 2\alpha_1 & \sin 2\alpha_1 & \cos\alpha_1 & \sin\alpha_1 \\ 1 & \cos 2\alpha_2 & \sin 2\alpha_2 & \cos\alpha_2 & \sin\alpha_2 \\ 1 & \cos 2\alpha_3 & \sin 2\alpha_3 & \cos\alpha_3 & \sin\alpha_3 \\ 1 & \cos 2\alpha_4 & \sin 2\alpha_4 & \cos\alpha_4 & \sin\alpha_4 \\ 1 & \cos 2\alpha_5 & \sin 2\alpha_5 & \cos\alpha_5 & \sin\alpha_5 \end{vmatrix}^{-1} \begin{Bmatrix} P_1 \\ P_2 \\ P_3 \\ P_4 \\ P_5 \end{Bmatrix}. \quad [16]$$

Where there are more than five power measurements, a least-squares solution or pseudo-inverse will yield the coefficients a, b, c, d, and e. From these coefficients, the five unknown values represented by X, Y, and Z are determined using Equations 9 through 13.

Going one step further, using these relationships, the phase correction term $\Delta\Psi_P$ of Equation 2 can also be expressed in terms of the coefficients X, Y, and Z. Surprisingly, this functional dependence is independent of the two angles-of-arrival $\theta$ and $\phi$. This much needed compensating term can now be expressed as $$\Delta\psi_P = \tan^{-1}\left\{\frac{N(X, Y, Z, \alpha_1, \alpha_2)}{D(X, Y, Z, \alpha_1, \alpha_2)}\right\} \quad [17]$$

where $$N(X, Y, Z, \alpha_1, \alpha_2) = (X_I \cos\alpha_2 + Y_I \sin\alpha_2)(X_R \cos\alpha_1 + Y_R \sin\alpha_1 + Z) - (X_I \cos\alpha_1 + Y_I \sin\alpha_1)(X_R \cos\alpha_2 + Y_R \sin\alpha_2 + Z) \quad [18]$$

$$D(X, Y, Z, \alpha_1, \alpha_2) = (X_I \cos\alpha_2 + Y_I \sin\alpha_2)(X_I \cos\alpha_1 + Y_I \sin\alpha_1) + (X_R \cos\alpha_2 + Y_R \sin\alpha_2 + Z)(X_R \cos\alpha_1 + Y_R \sin\alpha_1 + Z) \quad [19]$$

where $\alpha_1$ and $\alpha_2$ are the position angles of the pair of sensing elements from which the phase relationship was acquired.

As a final step the polarization induced phase correction $\Delta\Psi_P$ must be expressed in terms of the amplitude derived coefficients a, b, c, d and e. This is achieved by solving the algebraic system of Equations 9 through 13.

Using Equations 9, 10 and 11 with Equations 12 and 13 we obtain the following relations $$X_I^2 + Y_I^2 = \frac{8aZ^2 - d^2 - e^2 - 8Z^4}{4Z^2} \quad [20]$$

$$X_I^2 - Y_I^2 = \frac{8bZ^2 - (d^2 - e^2)}{4Z^2} \quad [21]$$

and $$X_I Y_I = \frac{4cZ^2 - de}{4Z^2}. \quad [22]$$

From Equations 20 and 21, we get $$X_I^2 = \frac{4(a+b)Z^2 - d^2 - 4Z^4}{4Z^2} \quad [23]$$

$$Y_I^2 = \frac{4(a-b)Z^2 - e^2 - 4Z^4}{4Z^2} \quad [24]$$

which, upon using the definitions of $X_I$ and $Y_I$ in Equations 6 and 7 gives also $$\tan^2\phi = \frac{X_I^2}{Y_I^2} \quad [25]$$

Since squaring Equation 22 is the same as taking the product of Equations 6 and 7, we have $$X_I^2 Y_I^2 = \frac{(4cZ^2 - de)^2}{16Z^4} \quad [26]$$
$$= \frac{(4(a+b)Z^2 - d^2 - 4Z^4)(4(a-b)Z^2 - e^2 - 4Z^4)}{16Z^4}.$$

Substituting the auxiliary variable $$t = 2Z^2 \quad [27]$$

and expressing Equation 26 in terms of t, yields the following polynomial relationship:

$$t(t^3 + k_1 t^2 + k_2 t + k_3) = 0 \quad [28]$$

with $$k_1 = -4a \quad [29]$$

$$k_2 = 4(a^2 - b^2) + d^2 + e^2 - 4c^2 \quad [30]$$

$$k_3 = -2(a-b)d^2 - 2(a+b)e^2 + 4cde. \quad [31]$$

In the absence of noise, only one root of the third order polynomial is real and therefore acceptable as the true solution. In contrast, in the presence of noise, sometimes all three roots may be real. This occurs whenever the estimated coefficients a, b, c, d and e lead to negative calculated power for some interval of $\alpha$. Since, physically, the power must be positive, this three-fold ambiguity can be removed by adding to the coefficient a the amount by which the calculated power falls below zero, specifically $|P_i|$ where $P_i$ is the minimum of the power function. When this correction is applied the solution of the revised third order polynomial expression will again yield only one positive real solution for the quantity $Z^2$ and, therefore, a two-fold sign ambiguity for the real quantity Z.

The quantities N and D in Equation 17 may be expressed also partially in terms of the quantities a, b, c, d and e as follows:

$$N(\alpha_1, \alpha_2) = ZX_I\left[-\frac{e}{2Z^2}\sin(\alpha_1 - \alpha_2) + \cos\alpha_1 - \cos\alpha_2\right] + \quad [32]$$
$$ZY_I\left[\frac{d}{2Z^2}\sin(\alpha_1 - \alpha_2) + \sin\alpha_1 - \sin\alpha_2\right]$$

$$D(\alpha_1, \alpha_2) = (a - Z^2)\cos(\alpha_1 - \alpha_2) + b\cos(\alpha_1 + \alpha_2) + c\sin(\alpha_1 + \alpha_2) + Z^2 + 0.5d(\cos(\alpha_1) + \cos(\alpha_2)) + 0.5e(\sin(\alpha_1) + \sin(\alpha_2)) \quad [33]$$

Clearly, the denominator D is unambiguous, since it depends only on $Z^2$. However, the numerator N has a fundamental sign ambiguity since Equation 23 provides us only with the square of the quantity $ZX_I$, namely $$Z^2 X_I^2 = \frac{4(a+b)Z^2 - d^2 - 4Z^4}{4}. \quad [34]$$

From Equation 34 we get the following sign ambiguous solutions $$ZX_I = \pm \frac{\sqrt{4(a+b)Z^2 - d^2 - 4Z^4}}{2}. \quad [35]$$

Once the sign in Equation 35 is chosen, the sign of the other required quantity $ZY_I$ is determined by the relation expressed by Equation 22, namely $$ZY_I = \frac{4cZ^2 - de}{4ZX_I}. \quad [36]$$

The two-fold ambiguity is fundamental, and therefore requires that each of the two possible phase correcting terms and their corresponding direction angles be calculated. This ambiguity is then resolved in the same manner as the ambiguity associated with the integer number of whole wavelengths, represented by n, in Equation 1.

As demonstrated above, $\Delta\Psi_P$, is independent of the unknown two angles-of-arrival and of the two unknown polarization parameters of the incoming RF signal. The phase correction is evaluated using the estimated values of the coefficients a, b, c, d, and e obtained exclusively from the measured power information of the incoming RF signal; the above coefficients are then related to the coefficients X, Y, Z based upon the polarization of the antenna elements and the relative orientation with respect to the array of antenna elements; the final correcting term is then determined and used for compensation of the measured electrical angle phase relationship in Equation 2. This correcting action functionally reduces the polarization diverse interferometric angles-of-arrival estimation problem to that of the classical interferometry problem. That is, $\Theta$ can now be expressed as $$\Theta = \arcsin[\lambda(\alpha\Psi - \Delta\Psi_P + 2n\pi)/(2\pi D_a)]. \quad [37]$$

Figure 7:
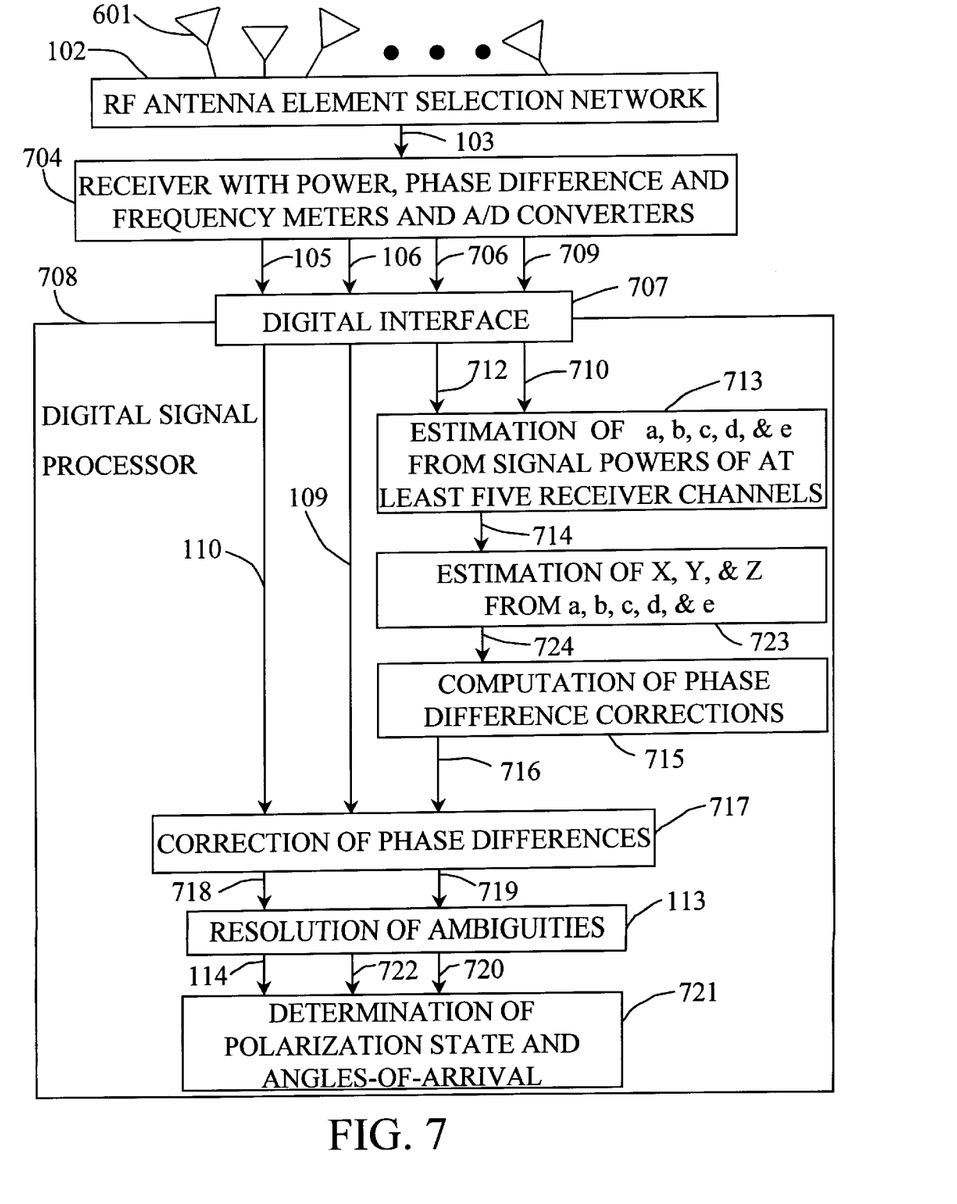
FIG. 7 is a flow chart of a process according to the present invention for determining angles-of-arrival for a RF antenna element array with elements of diverse orientations of polarization.

FIG. 7 shows a flowchart of a direction-finding, DF, method exploiting the phase correcting steps of the present invention. For this implementation at least five separate channels of a receiver are processed in order to estimate the coefficients a, b, c, d, and e. These estimates are then used to calculate the five unknowns $X_R$, $X_I$, $Y_R$, $Y_I$, and Z, which in turn are required in order to determine the phase correction for each pair of antennas involved in the angles-of-arrival ambiguity removal and estimation.

ESTIMATION OF THE POLARIZATION STATE

Once the angles-of-arrival have been unambiguously determined, the polarization angles $\gamma$ and $\delta$ of the incoming signal are determined using the values of the coefficients $X_R$, $X_I$, $Y_R$, $Y_I$, and Z and the unambiguous angles-of-arrival $\theta$ and $\phi$. Referring to Equation 5, the complex exponential is divided through the expression for the voltage, leaving an expression in terms of the complex coefficients, X, Y, and Z, as well as the position angle $\alpha$ 408. With the acquisition of three or more such expressions for the voltage, a system of equations, is constructed from which X, Y, and Z are derived after psuedo-inversion. The expressions for X, Y, and Z may thereafter be expressed as a function of the polarization state angles of the incoming electromagnetic wave. For example, for a system of infinitesimal dipole antenna elements where the receiver polarization of each of the sensing elements is linearly-polarized in the radial direction with a tilt angle $\tau$, the relation between the complex coefficients and the polarization angles is given by $$X = X_R + jX_I = E \cos(\gamma)\cos(\tau)[\cos(\theta)\cos(\phi) + \Gamma \sin(\phi)] \quad [38]$$

$$Y = Y_R + jY_I = E \cos(\gamma)\cos(\tau)[\cos(\theta)\sin(\phi) - \Gamma \cos(\phi)] \quad [39]$$

$$Z = -E \cos(\gamma)\sin(\tau)\sin(\theta) \quad [40]$$

where E is the electric field strength of the electromagnetic wave, and $\Gamma = \tan(\gamma)e^{i\delta}$. Therefore, upon solving such a system of equations, one will have uniquely derived the polarization state of the incoming electromagnetic wave using a system of polarization-diverse antenna elements.

DETAILED DESCRIPTION OF THE PREFERRED EMBODIMENTS

Referring now to the other figures in detail wherein like reference numerals indicate like elements throughout the several views, FIG. 3 illustrates the orientation and mounting of a RF antenna element array 311 of diverse orientations of polarization with angles-of-arrival to a source of RF emissions 306 used to explain the present invention. An individual RF sensing element 301, when working in cooperation with other similar elements mounted on a surface 302, becomes an integral part of a RF antenna array 311. The mounting surface 302 illustrated is the shape of a cone with a rounded apex and could also be the shape of a right cone, a cylinder or any other convex or even concave surface. A principal axis 303 passes through a point at the center of the conical base of 302 and a point at the tip of the rounded apex. The antenna array 311 forms a ring around the principal axis 303. With the principal axis defining a forward horizontal directional axis, then 304 is a down directional axis and 305 is a "to the right" directional axis. A vector directly from the center of the RF antenna array 311 to the RF emitting source 306 is designated the line-of-sight 307 vector, and is the directional vector of the RF emitting source 306 relative to the RF antenna array 311. The angle created by the sides 303 and 307 is 309. The angle 309 is one of two of the angles-of-arrival, θ.

FIG. 4 illustrates the transverse view of the RF antenna element array 311 of diverse orientation of polarization used to explain the present invention. The transverse view illustrates the ring-shaped distribution of antenna elements comprising 311. The vector from the center of the ring 311 to an antenna element, 406, sensing a RF emission is designated 407. The angle between the sides of 305 and 407 is 408. The angle 408 is an antenna element position angle α. The projection of the line-of-sight vector 307 shown in FIG. 3 onto the plane of the array of elements is 410. The angle created by the body-fixed, "to the right" directional axis reference 305 and the line-of-sight vector projection 410 is the second angle-of-arrival 411, φ.

Figure 5:
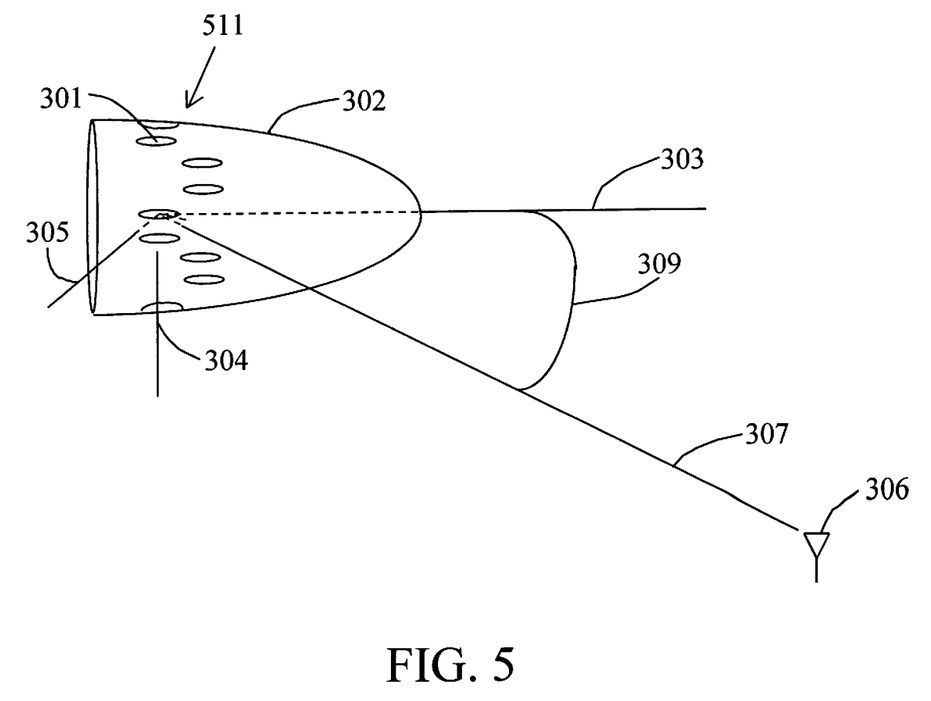
FIG. 5 illustrates the orientation and mounting of a second RF antenna element array of diverse orientations of each element's respective polarization with angles-of-arrival to a source of RF emissions used to explain the present invention.

FIG. 5 illustrates an alternate orientation and mounting of a RF antenna element array 511 of diverse orientation of each element's polarization with angles-of-arrival to a source of RF emissions 306 used to explain the present invention. An individual RF sensing element 301, when working in cooperation with other similar elements mounted on a surface 302, becomes an integral part of the RF antenna array 511. The mounting surface 302 illustrated in the shape of a cone with a rounded apex and could also be the shape of a right cone, a cylinder or other convex or concave shapes. The principal axis 303 passes through a point at the center of the conical base of 302 and a point at the tip of the rounded apex. The antenna array 511 forms substantially parallel rings surrounding and perpendicular to the principal axis 303. Remaining designations within FIG. 5 are the same as in FIG. 3.

Figure 6:
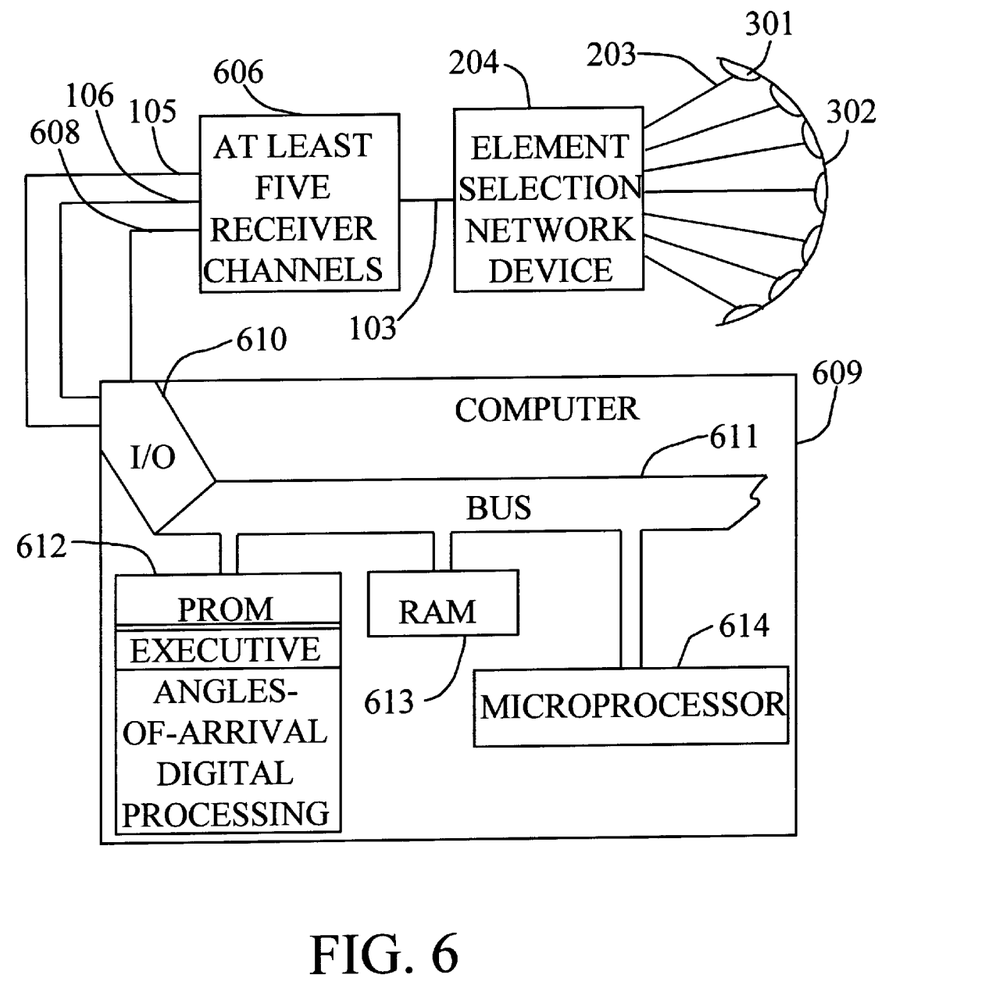
FIG. 6 is a block diagram of the present invention.

FIG. 6 illustrates a block diagram of an apparatus for the implementation of the present invention. Individual RF sensing elements, 301, are mounted on a surface of curvature 302. Each element is connected to an element selection network 204 by an electrically conductive line 203. Each antenna element generates a voltage when excited by a RF waveform. The element selection network selects pairs of antenna elements for the application of interferometry. At least five receiver channels 606 are required for the present invention. The resulting sensing antennas' produced voltages are conveyed along a conductive harness 103 to a RF receiver 606. With a receiver channel for each signal, the receiver outputs a phase difference 105 for each particular signal pair and for each signal the receiver outputs a measure of power 608 or a measure of signal amplitude that can later be squared. Additionally, the receiver will output a measure of frequency of the RF signal 106. The phase differences 105, powers 608 and frequency 106 of the RF signal are input signals to the input/output interface, the I/O, 610, of a special computer generally designated 609. Within the programmable, read-only memory, PROM, 612 of the computer, there is stored both the executive software for communicating along the data bus 611 with hardware components and executing software and the angles-of-arrival digital processing. Erasable PROM could also be applied as could alternative storage media such as magnetic tape and magnetic or optical discs. EEPROM, Flash EEPROM or nonvolatile programmable RAM could also be alternative program storage media. Additionally, this software is stored in random access memory, RAM, 613, when the apparatus begins operation and the angles-of-arrival processing is conducted within the microprocessor 614.

FIG. 7 illustrates a flowchart for implementing the present invention. Antenna elements of diverse orientation of polarization sense incoming RF wave-forms and develop electrical voltages which are conveyed from a RF antenna element selection network 102 along a conducting harness 103 to receiver channels for producing paired differences within the receiver 704. The receiver produces digitized phase differences 105, digitized measures of power 706 and digitized measures of signal frequency 106. The phase differences 105, measures of power 706, measures of signal frequency 106, and the known angular orientations of the selected antenna elements 709 are inputs to a digital interface 707 of a digital signal processor 708. The digital measures of power within the digital signal processor 712 and the known digital angular orientations of the selected antenna elements 710 are used in the estimation of coefficients a, b, c, d, and e of 714 having been generated in 713. The coefficients 714 are used in 723 to determine the coefficients X, Y, Z as designated by 724, which in turn, are used directly in the determination of the phase difference corrections 716 determined in the step 715. The point of novelty in this process is the application of the digital measures of power 712, when processed through 713, 723, and 715, to correct the phase differences of an array of tilted RF sensing elements of diverse polarity. It is at this stage that the digital uncorrected phase differences 110, the phase difference corrections 716 and the digital measured signal frequency within the digital signal processor 109 are used to produce a correction of phase differences 717. The corrected phase differences 718 and the digital measured signal frequency 719 are used in the resolution of ambiguities in possible angles-of-arrival 113. The resolved angles 114, corrected phase differences 722 and the digital measured signal frequency 720 are used in determining the angles-of-arrival and the polarization states 721.

Figure 8:
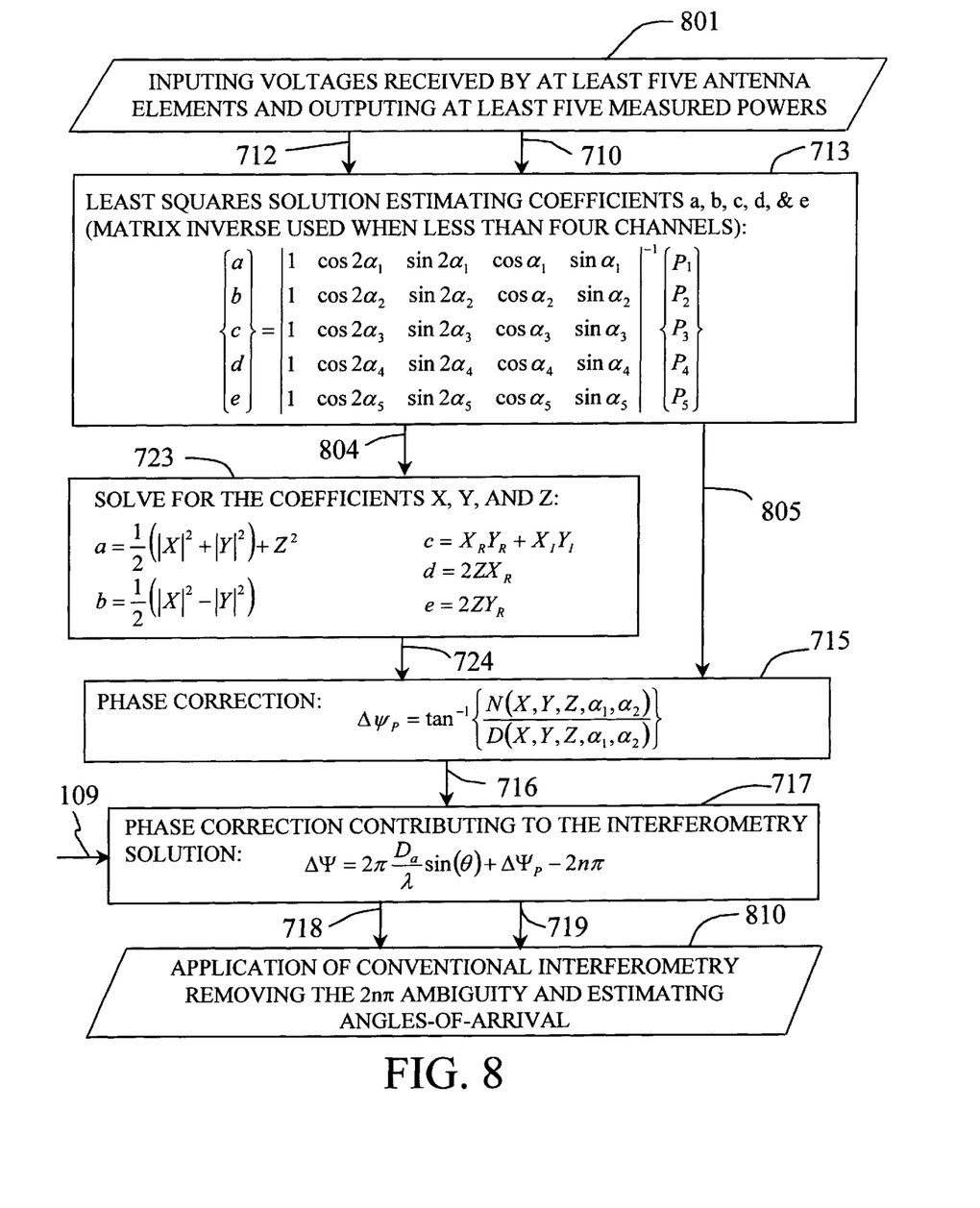
FIG. 8 is a flow chart of a process according to the present invention for correcting estimated signal phases for the application of interferometry based upon signal power measurements from an RF antenna element array with elements of diverse orientations of polarization.

FIG. 8 illustrates a detailed flowchart for implementing the point of novelty of the present invention. Voltages generated at individually selected antenna elements are received 801. Measured powers from at least five receivers 712 and the known angular orientations of the selected antenna elements 710 are applied according to 713 to estimate the coefficients a, b, c, d, and e. The coefficients 804 are applied to 723 where the five coefficients X, Y, and Z are determined prior to being conveyed to 715 by means of 724. In addition to the coefficients of 724 the angular orientations of two of the five antenna elements used in the least squares solution 805 are then applied according to 715 to determine the corresponding phase correction 716. The measured frequency 109 is applied in the reciprocal form of a wavelength along with the phase correction 716 to obtain the classical interferometric representation for phase difference 717. Then the last step is the application of conventional interferometry to the corrected phase 718 and the signal wavelength 719 removing the $2n\pi$ ambiguity and estimating the angles-of-arrival 810.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

What we claim is:

1. An improved apparatus for determining the angles-of-arrival and polarization states of a plurality of incoming electromagnetic waves, said apparatus of the type having means for determining the frequencies of said plurality of incoming electromagnetic waves, wherein the improvement comprises:

(a) an antenna array comprising at least six sensing elements of differing and substantially known orientations of the polarization for converting said plurality of incoming electromagnetic waves into voltages; said elements being distributed about a principal axis where said distribution has a geometric center coinciding with the principal axis; each of said elements possessing a tilted polarization orientation characterized by a tilt angle with respect to said principal axis where the polarization orientation of each sensing element is tilted an equivalent angle; said polarization orientation capable of assuming values between zero and $2\pi$, inclusive, excepting polarization orientations that are substantially radial from the geometric center of said antenna array;

(b) an element selection network for electrically and switchably conducting said plurality of incoming electromagnetic waves as voltages to a receiver comprising at least five channels for receiving said plurality of incoming electromagnetic waves as voltages; said antenna element selection network providing at least five output signals;

(c) measuring means for determining signal power of said voltages of said plurality of incoming electromagnetic waves as produced by said receiver;

(d) a plurality of differencing junctions for determining phase differences of the plurality of incoming electromagnetic waves as produced by said receiver;

(e) processing means for determining phase corrections to said phase differences of said plurality of incoming electromagnetic waves from said signal power of said voltages;

(f) at least one summing junction for correcting said phase differences with said phase corrections; and (g) processing means for resolving angular ambiguities with said plurality of incoming electromagnetic waves and the corrected phase difference;

whereby said angles-of-arrival and polarization of incoming electromagnetic waves are determined.

2. An apparatus as claimed in claim 1 wherein said plurality of incoming electromagnetic waves are a plurality of incoming RF signals.

3. An apparatus as claimed in claim 2 wherein each RF sensing element phase center of said antenna array is cylindrically distributed where said distribution is characterized by a long axis coinciding with said principal axis; each of said phase centers being substantially equidistant from said principal axis.

4. An apparatus as claimed in claim 3 wherein each RF sensing element phase center of said antenna array is substantially coplanar in relation to all other phase centers of said RF sensing elements, and substantially circular in positional planar relationship to all other phase centers of elements.

5. An apparatus as claimed in claim 4 wherein said RF sensing element of said antenna array are linearly-polarized dipole antennas.

6. An apparatus as claimed in claim 4 wherein said processing means for determining corrections to said phase differences of said plurality of incoming RF signals from said signal power of said voltages comprises:

(a) estimating means for determining from said signal power of said voltages a first coefficient, a, a second coefficient, b, a third coefficient, c, a fourth coefficient, d, and a fifth coefficient, e, for each of said voltages;

(b) estimating means for determining from the coefficients a, b, c, d, and e, for determining complex variables, X and Y, and the real variable Z; and (c) estimating means for determining said corrections from combining said complex variables X and Y, and said real variable, Z, for each of said voltages.

7. An apparatus as claimed in claim 6 wherein said first coefficient, a, said second coefficient, b, said third coefficient, c, said fourth coefficient, d, and said fifth coefficient, e, are determined for constant antenna position angles, $\alpha_1$ by solving at least five simultaneous linear equations where $$\begin{Bmatrix} a \\ b \\ c \\ d \\ e \end{Bmatrix} = \text{pseudo} - \text{inverse} \begin{bmatrix} 1 & \cos 2\alpha_1 & \sin 2\alpha_1 & \cos \alpha_1 & \sin \alpha_1 \\ 1 & \cos 2\alpha_2 & \sin 2\alpha_2 & \cos \alpha_2 & \sin \alpha_2 \\ 1 & \cos 2\alpha_3 & \sin 2\alpha_3 & \cos \alpha_3 & \sin \alpha_3 \\ 1 & \cos 2\alpha_4 & \sin 2\alpha_4 & \cos \alpha_4 & \sin \alpha_4 \\ 1 & \cos 2\alpha_5 & \sin 2\alpha_5 & \cos \alpha_5 & \sin \alpha_5 \end{bmatrix} \begin{Bmatrix} P_1 \\ P_2 \\ P_3 \\ P_4 \\ P_5 \end{Bmatrix}.$$

8. An apparatus as claimed in claim 6 wherein said phase correction, $\Delta\Psi_P$ for a particular incoming RF signal is determined with $$\Delta\psi_P = \tan^{-1}\left\{\frac{N(X, Y, Z, \alpha_1, \alpha_2)}{D(X, Y, Z, \alpha_1, \alpha_2)}\right\}$$

where $N(X,Y,Z,\alpha_1,\alpha_2) = (X_I \cos \alpha_2 + Y_I \sin \alpha_2)(X_R \cos \alpha_1 + Y_R \sin \alpha_1 + Z) - (X_I \cos \alpha_1 + Y_I \sin \alpha_1)(X_R \cos \alpha_2 + Y_R \sin \alpha_2 + Z)$ $D(X,Y,Z,\alpha_1,\alpha_2) = (X_I \cos \alpha_2 + Y_I \sin \alpha_2)(X_I \cos \alpha_1 + Y_I \sin \alpha_1) + (X_R \cos \alpha_2 + Y_R \sin \alpha_2 + Z)(X_R \cos \alpha_1 + Y_R \sin \alpha_1 + Z)$ 9. An apparatus as claimed in claim 6 wherein said estimating means for determining from said signal power of said voltages said first coefficient, said second coefficient, said third coefficient, said fourth coefficient, and said fifth coefficient comprises a least squares solution.

10. An apparatus as claimed in claim 6 wherein said estimating means for determining from said signal power of said voltages said first coefficient, said second coefficient, said third coefficient, said fourth coefficient, and said fifth coefficient comprises a maximum likelihood solution.

11. An apparatus as claimed in claim 2 wherein said antenna array comprises:

(a) a first sub-array; said first sub-array comprising each element phase center of first approximately half of said plurality of RF sensing elements; substantially coplanar, and substantially circular in positional planar relationship to all other centers of elements, and substantially perpendicular to said principal axis; and (b) a second sub-array; said second sub-array comprising each element phase center of second approximately half of said plurality of RF sensing elements; substantially coplanar, substantially circular in positional planar relationship to all other phase centers of elements, and substantially parallel to said first sub-array.

12. An apparatus as claimed in claim 2 wherein said processing means for determining said phase differences of said plurality of incoming RF signals as produced by said receiver comprises at least five channels for receiving includes a plurality of phase detectors; said plurality of phase detectors comprising mixers and filters for each combination of pairs of said at least five channels for receiving.

13. An apparatus as claimed in claim 2 wherein said processing means for resolving angular ambiguities comprises selecting one or more baselines of said RF sensing elements separated by less than one-half wavelength of at least one of said incoming RF signals.

14. An apparatus as claimed in claim 2 wherein said processing means for resolving angular ambiguities comprises pairs of parallel baselines for resolving in like manner as three or more collinear antennas with baselines greater than $\lambda/2$; collinear equivalent separations existing in compatibly specific ratios.

15. An apparatus as claimed in claim 2 wherein said means for determining frequencies of said plurality of incoming RF signals comprises a time-based differencing of said plurality of incoming RF signals circuit as conducted within at least one channel of said receiver.

16. An apparatus as claimed in claim 1 wherein said means for determining signal power of said voltages of said plurality of incoming electromagnetic waves as produced by said receiver is at least five square law detectors wherein each channel for receiving transmits to a unique member of said at least five square law detectors.

17. An apparatus as claimed in claim 16 wherein said square law detectors comprise synchronous detectors, whereby squares of in-phase and quadrature components of said voltages are summed.

18. An apparatus as claimed in claim 16 wherein said square law detectors comprise square law diode detectors, amplifiers and analog-to-digital converters, whereby squares of in-phase and quadrature components of said voltages are summed.

19. An apparatus as claimed in claim 1 wherein said processing means for determining corrections to said phase differences of said plurality of incoming RF signals from said signal power of said voltages receives prior knowledge of at least one initial approximate angle-of-arrival value of at least one of said plurality of incoming RF signals.

20. An apparatus as claimed in claim 1 wherein said processing means for determining corrections to said phase differences of said plurality of incoming RF signals from said signal power of said voltages receives prior knowledge of at least one initial approximate polarization state of at least one of said incoming RF signals.

21. A method for determining angles-of-arrival and polarization states of a plurality of incoming electromagnetic waves comprising the steps of:
  (a) converting said plurality of incoming electromagnetic waves into voltages with an antenna array comprising a plurality of RF sensing elements of differing and substantially known polarization orientations;
  (b) electrically and switchably conducting said voltages from a plurality of said RF sensing elements to a receiver comprising at least five channels for receiving said produced voltages with an antenna selection network means; said antenna selection network means providing at least five output signals;
  (c) determining signal power of said voltages of said plurality of incoming RF signals as produced by said receiver;
  (d) determining frequencies of said sensed incoming RF signals;
  (f) determining phase differences of said sensed incoming RF signals as produced by said receiver;
  (g) determining corrections to said phase differences of said sensed incoming RF signals from said signal power of said voltages by first determining the coefficients a, b, c, d, and e as defined by:

$$\begin{Bmatrix} a \\ b \\ c \\ d \\ e \end{Bmatrix} = \text{pseudo-inverse} \begin{bmatrix} 1 & \cos 2\alpha_1 & \sin 2\alpha_1 & \cos \alpha_1 & \sin \alpha_1 \\ 1 & \cos 2\alpha_2 & \sin 2\alpha_2 & \cos \alpha_2 & \sin \alpha_2 \\ 1 & \cos 2\alpha_3 & \sin 2\alpha_3 & \cos \alpha_3 & \sin \alpha_3 \\ 1 & \cos 2\alpha_4 & \sin 2\alpha_4 & \cos \alpha_4 & \sin \alpha_4 \\ 1 & \cos 2\alpha_5 & \sin 2\alpha_5 & \cos \alpha_5 & \sin \alpha_5 \end{bmatrix} \begin{Bmatrix} P_1 \\ P_2 \\ P_3 \\ P_4 \\ P_5 \end{Bmatrix}$$

and then determining said corrections directly as defined by:

$$\Delta \psi_P = \tan^{-1} \left\{ \frac{N(X, Y, Z, \alpha_1, \alpha_2)}{D(X, Y, Z, \alpha_1, \alpha_2)} \right\}$$

where $N(X,Y,Z,\alpha_1,\alpha_2) = (X_I \cos \alpha_2 + Y_I \sin \alpha_2)(X_R \cos \alpha_1 + Y_R \sin \alpha_1 + Z) - (X_I \cos \alpha_1 + Y_I \sin \alpha_1)(X_R \cos \alpha_2 + Y_R \sin \alpha_2 + Z)$ $D(X,Y,Z,\alpha_1,\alpha_2) = (X_I \cos \alpha_2 + Y_I \sin \alpha_2)(X_I \cos \alpha_1 + Y_I \sin \alpha_1) + (X_R \cos \alpha_2 + Y_R \sin \alpha_2 + Z)(X_R \cos \alpha_1 + Y_R \sin \alpha_1 + Z)$ (h) correcting said phase differences with said corrections with at least one summing junction; and
  (i) resolving angular ambiguities with said frequencies of said sensed incoming RF signals and the corrected phase differences whereby said angles-of-arrival and polarization of incoming RF signals are determined.

22. A improved method for determining angles-of-arrival and polarization states of a plurality of incoming electromagnetic waves of the type wherein said plurality of incoming electromagnetic waves are converted into voltages with an antenna array of the type wherein a plurality of RF sensing elements of differing substantially known polarization orientations are arranged in conformal rings, said voltages are electrically and switchably conducted from a plurality of said RF sensing elements to a receiver comprising at least five channels for receiving said produced voltages with an antenna element selection network providing at least five output signals, signal power and frequency of said voltages of said plurality of incoming RF signals and relative phase are determined by differencing selected receiver channels within said receiver, and angular ambiguities are resolved, the improvement comprising:
  (a) determining corrections to said phase differences of said sensed incoming RF signals from said signal power of said voltages and known antenna element orientations by first determining coefficients a, b, c, d, and e according to:

$$\begin{Bmatrix} a \\ b \\ c \\ d \\ e \end{Bmatrix} = \text{pseudo-inverse} \begin{bmatrix} 1 & \cos 2\alpha_1 & \sin 2\alpha_1 & \cos \alpha_1 & \sin \alpha_1 \\ 1 & \cos 2\alpha_2 & \sin 2\alpha_2 & \cos \alpha_2 & \sin \alpha_2 \\ 1 & \cos 2\alpha_3 & \sin 2\alpha_3 & \cos \alpha_3 & \sin \alpha_3 \\ 1 & \cos 2\alpha_4 & \sin 2\alpha_4 & \cos \alpha_4 & \sin \alpha_4 \\ 1 & \cos 2\alpha_5 & \sin 2\alpha_5 & \cos \alpha_5 & \sin \alpha_5 \end{bmatrix} \begin{Bmatrix} P_1 \\ P_2 \\ P_3 \\ P_4 \\ P_5 \end{Bmatrix}$$

and then determining the corrections according to:

$$\Delta \psi_P = \tan^{-1} \left\{ \frac{N(X, Y, Z, \alpha_1, \alpha_2)}{D(X, Y, Z, \alpha_1, \alpha_2)} \right\}$$

where $N(X,Y,Z,\alpha_1,\alpha_2) = (X_I \cos \alpha_2 + Y_I \sin \alpha_2)(X_R \cos \alpha_1 + Y_I \sin \alpha_1 + Z) - (X_I \cos \alpha_1 + Y_I \sin \alpha_1)(X_R \cos \alpha_2 + Y_R \sin \alpha_2 + Z)$ $D(X,Y,Z,\alpha_1,\alpha_2) = (X_I \cos \alpha_2 + Y_I \sin \alpha_2)(X_I \cos \alpha_1 + Y_I \sin \alpha_1) + (X_R \cos \alpha_2 + Y_R \sin \alpha_2 + Z)(X_R \cos \alpha_1 + Y_R \sin \alpha_1 + Z)$ and (b) correcting said phase differences with said corrections with at least one summing junction prior to resolving angular ambiguities with said frequencies of said sensed incoming RF signals and the corrected phase differences whereby said angles-of-arrival and polarization of incoming RF signals are determined.

23. An apparatus for determining angles-of-arrival and polarization states of a plurality of incoming electromagnetic waves comprising:

(a) an antenna array comprising a plurality of sensing elements of differing substantially known polarization orientations for converting said plurality of incoming electromagnetic waves into; said elements being distributed about a principal axis where said distribution has a geometric center coinciding with said axis; each of said elements possessing a tilted polarization orientation characterized by a tilt angle with respect to said principal axis; each polarization orientation tilted an equivalent angle; said polarization orientation capable of assuming values between zero and $2\pi$, inclusive, excepting polarization orientations that are substantially radial from the geometric center of said antenna array;

(b) an antenna element selection network for electrically and switchably conducting said plurality of incoming electromagnetic waves as voltages to a receiver comprising at least five channels for receiving said plurality of incoming electromagnetic waves as voltages; said antenna element selection network providing at least five output signals;

(c) at least five square law detectors wherein each channel for receiving transmits to a unique member of said at least five square law detectors for determining signal power of said voltages of said plurality of incoming electromagnetic waves as produced by said receiver;

(d) a circuit for time-based differencing of said plurality of incoming RF signals as conducted within at least one channel of said receiver for determining frequencies of said plurality of incoming electromagnetic waves;

(e) a plurality of differencing junctions for determining phase differences of said plurality of incoming electromagnetic waves as produced by at least five receiver channels within said receiver;

(f) processing means for determining corrections to said phase differences of said plurality of incoming electromagnetic waves from said signal power of said voltages by first determining coefficients a, b, c, d, and e from said signal power and known antenna element orientations according to:

$$\begin{Bmatrix} a \\ b \\ c \\ d \\ e \end{Bmatrix} = \text{pseudo-inverse} \begin{bmatrix} 1 & \cos 2\alpha_1 & \sin 2\alpha_1 & \cos \alpha_1 & \sin \alpha_1 \\ 1 & \cos 2\alpha_2 & \sin 2\alpha_2 & \cos \alpha_2 & \sin \alpha_2 \\ 1 & \cos 2\alpha_3 & \sin 2\alpha_3 & \cos \alpha_3 & \sin \alpha_3 \\ 1 & \cos 2\alpha_4 & \sin 2\alpha_4 & \cos \alpha_4 & \sin \alpha_4 \\ 1 & \cos 2\alpha_5 & \sin 2\alpha_5 & \cos \alpha_5 & \sin \alpha_5 \end{bmatrix} \begin{Bmatrix} P_1 \\ P_2 \\ P_3 \\ P_4 \\ P_5 \end{Bmatrix}$$

and then determining the corrections according to:

$$\Delta \psi_P = \tan^{-1} \left\{ \frac{N(X,Y,Z,\alpha_1,\alpha_2)}{D(X,Y,Z,\alpha_1,\alpha_2)} \right\}$$

where $N(X,Y,Z,\alpha_1,\alpha_2) = (X_I \cos \alpha_2 + Y_I \sin \alpha_2)(X_R \cos \alpha_1 + Y_R \sin \alpha_1 + Z) - (X_I \cos \alpha_1 + Y_I \sin \alpha_1)(X_R \cos \alpha_2 + Y_R \sin \alpha_2 + Z)$ $D(X,Y,Z,\alpha_1,\alpha_2) = (X_I \cos \alpha_2 + Y_I \sin \alpha_2)(X_I \cos \alpha_1 + Y_I \sin \alpha_1) + (X_R \cos \alpha_2 + Y_R \sin \alpha_2 + Z)(X_R \cos \alpha_1 + Y_R \sin \alpha_1 + Z)$ (g) at least one summing junction for correcting said phase differences with said corrections; and (h) processing means for resolving angular ambiguities with said frequencies of said plurality of incoming electromagnetic waves and the corrected phase differences whereby said angles-of-arrival and polarization of incoming electromagnetic waves are determined.

* * * * *

UNITED STATES PATENT AND TRADEMARK OFFICE
CERTIFICATE OF CORRECTION

PATENT NO. : 6,195,043 B1  
DATED : February 27, 2001  
INVENTOR(S) : Teodoro Azzarelli, Paul Kwon and Ephraim Mendelovicz Page 1 of 1

It is certified that error appears in the above-identified patent and that said Letters Patent is hereby corrected as shown below:

<u>Title page,</u>  
Item [54], "TITLED" should read -- TILTED -- .

<u>Column 1,</u>  
Line 3, "TITLED" should read -- TILTED -- .

Signed and Sealed this

Second Day of October, 2001

Attest:

NICHOLAS P. GODICI  
*Attesting Officer*    *Acting Director of the United States Patent and Trademark Office*